(12) United States Patent
Wilson et al.

(10) Patent No.: US 11,514,814 B2
(45) Date of Patent: Nov. 29, 2022

(54) WEARABLE DEVICE ENABLEMENT FOR VISUALLY IMPAIRED USER

(71) Applicant: INTERNATIONAL BUSINESS MACHINES CORPORATION, Armonk, NY (US)

(72) Inventors: John D. Wilson, League City, TX (US); Shikhar Kwatra, San Jose, CA (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 16/948,351

(22) Filed: Sep. 15, 2020

(65) Prior Publication Data

US 2022/0084433 A1    Mar. 17, 2022

(51) Int. Cl.
| | |
|---|---|
| G09B 19/00 | (2006.01) |
| G10L 15/22 | (2006.01) |
| G10L 15/18 | (2013.01) |
| G09B 21/00 | (2006.01) |
| G06N 5/04 | (2006.01) |
| G06N 20/00 | (2019.01) |
| G06V 20/10 | (2022.01) |

(52) U.S. Cl.
CPC ............ *G09B 19/003* (2013.01); *G06N 5/04* (2013.01); *G06N 20/00* (2019.01); *G09B 21/001* (2013.01); *G10L 15/1815* (2013.01); *G10L 15/22* (2013.01); *G06V 20/10* (2022.01); *G09B 21/003* (2013.01); *G09B 21/006* (2013.01); *G09B 21/007* (2013.01); *G10L 2015/223* (2013.01)

(58) Field of Classification Search
CPC ... G10L 15/22; G10L 15/1815; G09B 21/001; G09B 19/003; G06N 5/04; G06N 20/00
See application file for complete search history.

(56) References Cited

U.S. PATENT DOCUMENTS

| | | | |
|---|---|---|---|
| 3,967,321 | A | 7/1976 | Ryan |
| 7,864,991 | B2 | 1/2011 | Espenlaub |

(Continued)

FOREIGN PATENT DOCUMENTS

| | | |
|---|---|---|
| CN | 106462229 A | 2/2017 |
| CZ | 26156 U1 | 12/2013 |

(Continued)

OTHER PUBLICATIONS

Agashe, et al., "Reconstructing hand kinematics during reach to grasp movements from electroencephalographic signals," 33rd Annual International Conference of the IEEE EMBS, Aug. 30-Sep. 3, 2011, pp. 5444-5447, Boston, MA.

(Continued)

*Primary Examiner* — Kesha Frisby
(74) *Attorney, Agent, or Firm* — Anthony M. Pallone (57) ABSTRACT

A wearable device determines an objective based on analyzing a voice of a user, where the wearable device comprises one or more wearable sensors and one or more wearable actuators. The wearable device identifies objects by the one or more wearable sensors. The wearable device determines an action based on the objective and the identified objects and guides the user to achieve and objective by the one or more wearable actuators.

20 Claims, 6 Drawing Sheets

(56) References Cited

U.S. PATENT DOCUMENTS

| | | | |
|---|---|---|---|
| 9,311,827 B1* | 4/2016 | Alqahtani | A43B 3/34 |
| 2010/0013612 A1 | 1/2010 | Zachman | |
| 2015/0196101 A1* | 7/2015 | Dayal | G01C 21/3602 |
| | | | 63/1.11 |
| 2015/0198455 A1* | 7/2015 | Chen | G01C 21/3623 |
| | | | 701/428 |
| 2015/0374575 A1 | 12/2015 | Kamper | |
| 2016/0063893 A1* | 3/2016 | Kanuganti | H04N 21/8545 |
| | | | 348/62 |
| 2017/0032787 A1* | 2/2017 | Dayal | G10L 15/22 |
| 2017/0151081 A1 | 6/2017 | Feris | |
| 2018/0188722 A1 | 7/2018 | Erickson | |

FOREIGN PATENT DOCUMENTS

| | | |
|---|---|---|
| DE | 102014211257 A1 | 12/2015 |
| IN | 201821039926 A | 11/2018 |
| KR | 20190023737 A | 3/2019 |
| TW | 202108102 A | 3/2021 |

OTHER PUBLICATIONS

Dicicco, et al., "Comparison of control strategies for an EMG controlled orthotic exoskeleton for the hand," Proceedings of the 2004 IEEE International Conference on Robotics 6 Automation, Apr. 2004, pp. 1622-1627, New Orleans, LA.

Mell, et al., "The NIST Definition of Cloud Computing", National Institute of Standards and Technology, Special Publication 800-145, Sep. 2011, 7 pages.

Yi, et al., "Finding objects for assisting blind people." Netw Model Anal Health Inform Bioinforma, 2013, pp. 71-79, DOI 10.1007/s13721-013-0026-x, Springer-Verlag Wien.

International Search Report and Written Opinion of International Application No. PCT/IB2021/057814, dated Nov. 25, 2021, 8 pages.

Qian, "National Robotics Program Funding Priorities," Shanghai Informatization Feb. 10, 2016 (Feb. 10, 2016), 6 pages.

Tencent, "Wearable Device Helps Blind People See Objects," Dec. 19, 2015, https://tech.huanqiu.corn/article/9CaK.mJSsJp I0, 2 pages.

Wilson et al., "Wearable Device Enablement for Visually Impaired User," Application and Drawings, Filed on Aug. 26, 2021, 26 Pages, International Application No. PCT/IB2021/057814.

\* cited by examiner

WEARABLE DEVICE ENABLEMENT FOR VISUALLY IMPAIRED USER

BACKGROUND

The present invention relates, generally, to the field of computing, and more particularly to assisting a visually impaired user to achieve an objective by one or more wearable devices.

A visually impaired user is a person having a decreased ability to see to a degree that impairs the ability of the user to differentiate various objects and assess the distance and the size of the objects in an immediate surrounding. Therefore, a visually impaired user has difficulties interacting with surroundings and physical objects, such as grasping a pen from the table, grabbing a glass of water or avoiding hitting a closing door.

SUMMARY

According to one embodiment, a method, computer system, and computer program product for visually impaired user enablement is provided. The present invention may include a wearable device determines an objective based on analyzing a voice of a user, where the wearable device comprises one or more wearable sensors and one or more wearable actuators. The wearable device identifies objects by the one or more wearable sensors. The wearable device determines an action based on the objective and the identified objects and guides the user to achieve and objective by the one or more wearable actuators.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to assisting a visually impaired user by one or more wearable devices. The following described exemplary embodiments provide a system, method, and program product to, among other things, determine user requirements and using wearable devices to assist the visually impaired user to reach the requirements of the user. Therefore, the present embodiment has the capacity to improve the technical field of assisting a visually impaired user using a wearable device by determining user requirements with the help of natural language processing (NLP) such as speech-to-text and artificial intelligence (AI) components and guiding the user using actuators on the wearable device or using voice commands to reach the determined requirement.

As previously described, a visually impaired user is a person having a decreased ability to see to a degree that impairs the ability of the user to differentiate various objects and assess the distance and the size of the objects in an immediate surrounding. Therefore, visually impaired user has difficulties interacting with surroundings and physical objects, such as grasp a pen from the table, grab a glass of water or avoid hitting a closed door.

Visually impaired users typically use a mechanical device, such as a white cane, in order to avoid hitting objects or memorize specific object locations. However, modern life requires a visually impaired user to be mobile and adapt to constantly changing environments. As such, it may be advantageous to, among other things, implement a system that uses one or more wearable devices to analyze a visually impaired user's surroundings and, by communicating with the user, assist the visually impaired user to achieve the desired objective.

According to one embodiment, a user may wear one or more wearable smart devices that determine user objectives using natural language processing (NLP). The one or more wearable smart devices may identify the object that is related to the determined user objective and, after determining the optimal body motion to that object, guide the user to achieve the objective using voice guidance and wearable actuators.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine user objectives by analyzing verbal instructions of the user using NLP and guiding the visually impaired user using voice and wearable actuators located on the smart wearable device in order to achieve the determined user objectives.

Figure 1:
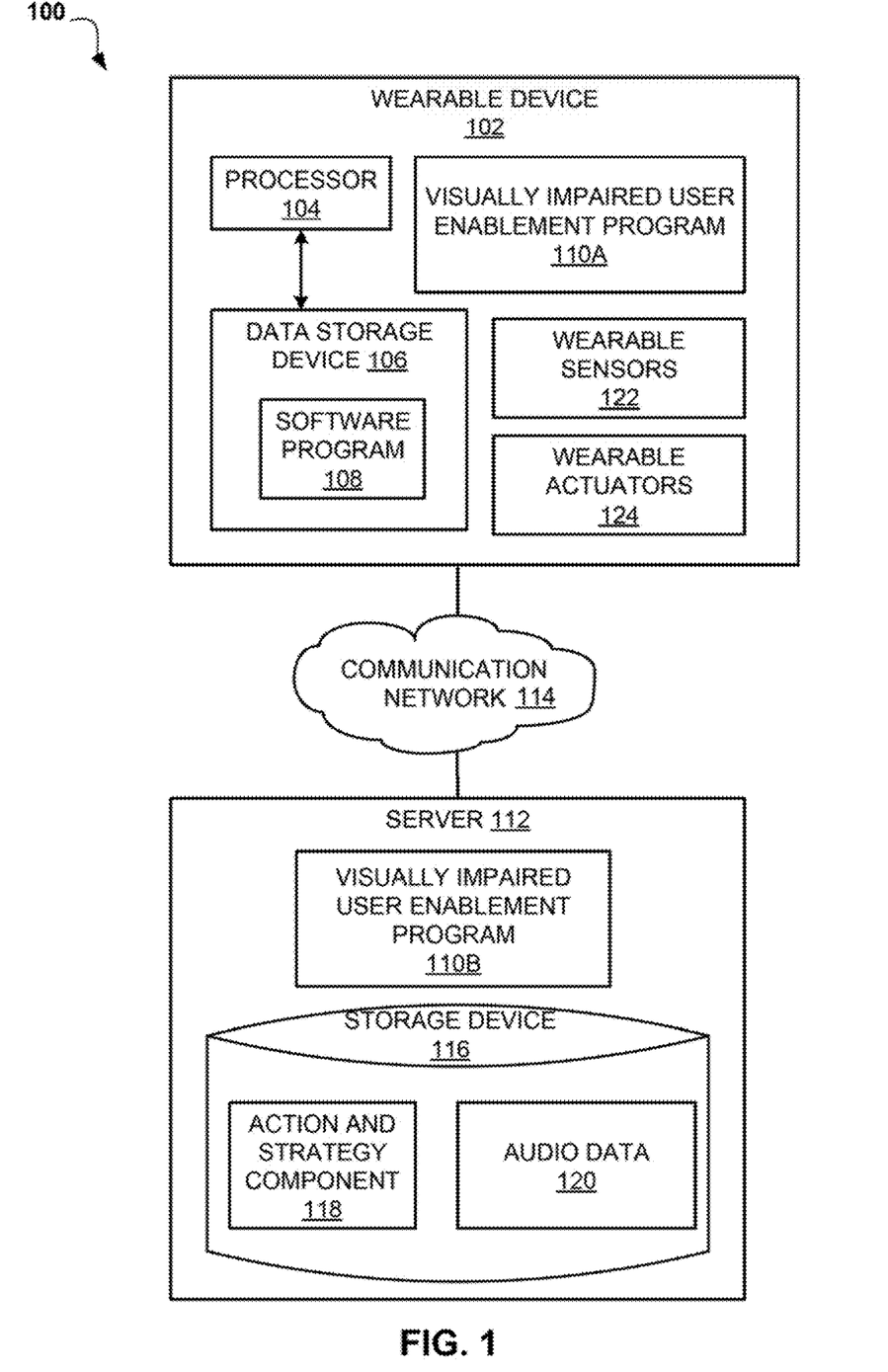
FIG. 1 illustrates an exemplary networked computer environment according to at least one embodiment.

Referring to FIG. 1, an exemplary networked computer environment 100 is depicted, according to at least one embodiment. The networked computer environment 100 may include wearable device 102 and a server 112 interconnected via a communication network 114. According to at least one implementation, the networked computer environment 100 may include a plurality of wearable devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Figure 3:
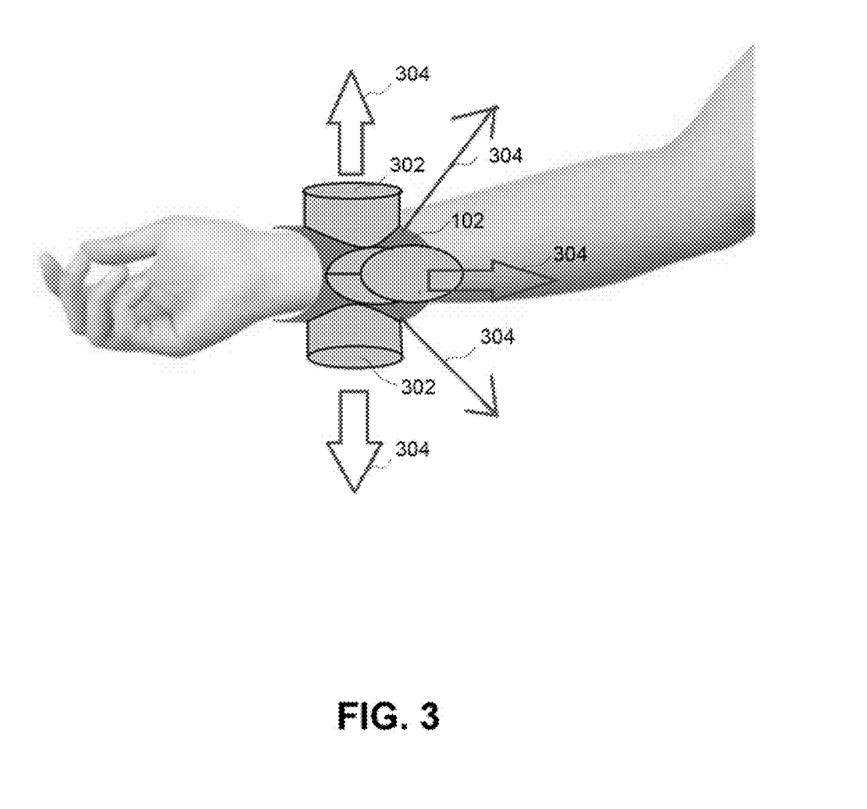
FIG. 3 depicts a wearable device used by the visually impaired user enablement process according to at least one embodiment.

Wearable device 102 may be one or more devices that include a processor 104 and a data storage device 106 that is enabled to host and run a software program 108 and a visually impaired user enablement (VIUE) program 110A and communicate with the server 112 via the communication network 114, in accordance with one embodiment of the invention. According to an example embodiment, wearable device 102 may incorporate or being capable to control wearable sensors 122 and wearable actuators 124. Wearable device 102 may be, for example, a mobile device, a smart bracelet, a smart watch, glasses or goggles, a telephone, a personal digital assistant, or any type of computing device attached to the body of the visually impaired user and capable of running a program and accessing a network. As will be discussed with reference to FIG. 4, the wearable device 102 may include internal components 402a and external components 404a, respectively and be of a shape and capable of using sensors and actuators to guide the user as depicted in FIG. 3.

Wearable sensors 122 may be one or more sensors attached or capable of tracking the environment and body motions of the visually impaired user. For example, wearable sensors 122 may be standalone devices capable of communicating with the wearable device 102 using communication network 114 or may be incorporated into the wearable device 102. Wearable sensors 122 may include one or more cameras, microphones, bioelectric sensors, global positioning system (GPS) sensors, Lidar sensors, thermistors, and micro-electro-mechanical sensors (MEMS), such as an accelerometer, a gyroscope, and a magnetometer.

Wearable actuators 124 may be one or more actuators capable of moving or applying forces or momentum on one or more movable parts of the human body. In another embodiment, wearable devices 124 may be capable of sending electrical currents (impulses) or vibrations to various body muscles or joints in order to move, guide or apply sensational impulses to the movable parts of the body of the visually impaired person in order to achieve the objective, such as moving hands or legs in a specific direction. According to an example embodiment, the wearable actuators 124 may be standalone devices capable of communicating with the wearable device 102 using communication network 114 or may be incorporated into the wearable device 102. Wearable actuators 124 may include one or more speakers, servo engines, rotors, gyro mechanisms, piezo-electric actuators, electrodes to electrify body muscles, and vibration actuators capable of giving guidance to the visually impaired user in order to correct his body movements.

The server computer 112 may be a laptop computer, netbook computer, personal computer (PC), a desktop computer, or any programmable electronic device or any network of programmable electronic devices capable of hosting and running a VIUE program 110B and a storage device 116 and communicating with the wearable device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The storage device 116 may be a tangible memory device capable of storing action and strategy component 118 and audio data 120. Audio data 120 may include a set of questions and answers asked by the user that VIUE program 110A, 110B may analyze and access in order to determine user requirements and guide the user to achieve the desired goal. The action and strategy component 118 may be a software program and database capable of determining user requirements by analyzing user commands stored in audio data 120 using natural language processing (NLP) that incorporates artificial intelligence (AI) and machine learning components, such as IBM® Watson® (IBM, Watson, all IBM-based trademarks and logos, and all Watson-based trademarks and logos are trademarks or registered trademarks of International Business Machines Corporation and/or its affiliates). When the requirements are determined, action and strategy component 118 may determine the distance and direction to the determined user requirements. For example, action and strategy component 118 may incorporate OpenCV distance detection algorithm, Kinect distance computation mechanism and object detection algorithm that uses image processing, such as AI and machine learning in order to identify objects received from the data of wearable sensors 122.

According to the present embodiment, the VIUE program 110A, 110B may be a program capable of determining user requirements and, by receiving data from one or more wearable sensors, guiding the visually impaired user to achieve the objectives using wearable actuators. The visually impaired user enablement method is explained in further detail below with respect to FIG. 2.

Figure 2:
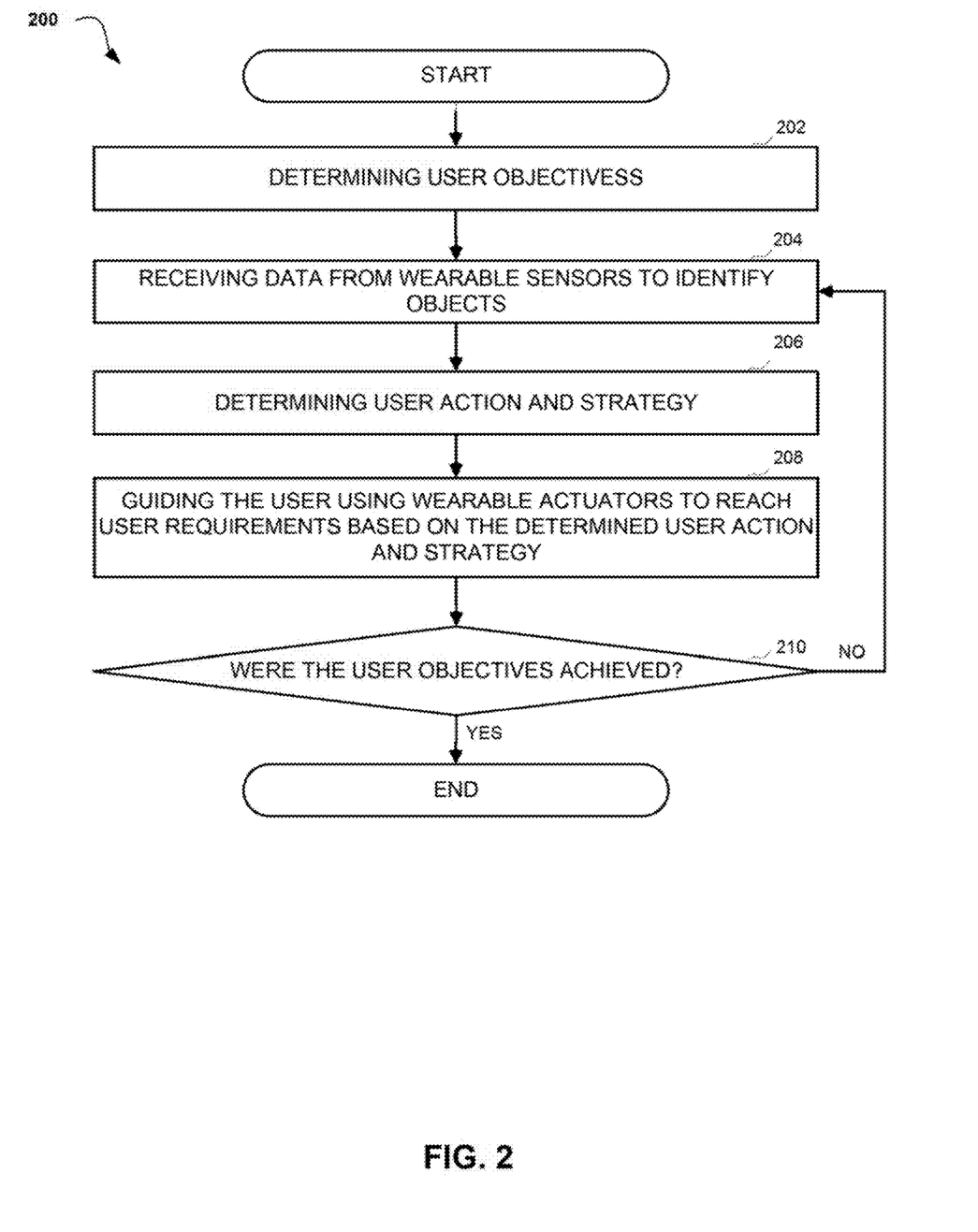
FIG. 2 is an operational flowchart illustrating a visually impaired user enablement process according to at least one embodiment.

Referring now to FIG. 2, an operational flowchart illustrating a VIUE process 200 is depicted according to at least one embodiment. At 202, the VIUE program 110A, 110B determines user objectives. According to an example embodiment, VIUE program 110A, 110B may receive via a microphone located on one or more wearable devices 102 a command or a verbal communication from the visually impaired user. For example, a user may say "I want to pick up a glass of water from the table". The VIUE program 110A, 110 may use a NLP such as voice-to-text conversion and then, by using AI or machine learning components, determine one or more objectives that the visually impaired user desires. In another embodiment, the VIUE program 110A, 110 may ask additional questions in order to determine the exact objectives of the user such as when there are several interpretations or several objects matching the request of the visually impaired user. For example, in the previously described scenario, multiple glasses of water may be present on a table and the VIUE program 110A, 110B may require further clarification as to which glass the visually impaired user wishes to pick up.

Next, at 204, the VIUE program 110A, 110B receives data from wearable sensors to identify objects. According to an example embodiment, the VIUE program 110A, 110B may use object recognition software to analyze visually impaired user's surroundings received from the wearable sensors 122 and determine the objects and obstacles that surround the visually impaired user. To continue the previous example, the VIUE program 110A, 110B may determine that there are several glasses of water on the table. In a further embodiment, the VIUE program 110A, 110B may ask for more specific instructions from the user in order to determine the exact object that the user requests to reach.

Then, at 206, the VIUE program 110A, 110B determines user action and strategy. According to an example embodiment, the VIUE program 110A, 110B may use data from wearable sensors 122 in order to identify objects and their distances, such as by utilizing one or more cameras. Then, according to an example embodiment, the VIUE program 110A, 110B may apply a processing python library software such as an adapted robotic arm control library software with OpenCV object detection algorithm software that may identify maximum reach of the hand or other part of the body in 3D space. Then, the VIUE program 110A, 110B may calculate the optimal strategy for the user to reach or avoid with the hand or other body part, the determined objective, such as reaching an object. When the object is unreachable by the intended body part, the VIUE program 110A, 110B may utilize audio instructions to the user in order to move closer and be within reach to get the object. In another embodiment, the VIUE program 110A, 110B may learn the motions of the user using wearable sensors 122, such as by recording user bioelectric signals and comparing the previously recorded signals to the signals currently measured when moving, the hand or other body part toward the desired object and thus determine whether the visually impaired user acts in accordance to the determined strategy.

Next, at 208, the VIUE program 110A, 110B guides the user using wearable actuators to reach user requirements based on the determined user action and strategy. According to an example embodiment, the VIUE program 110A, 110B guides the user using wearable actuators 124 that apply forces or other sensational impulses on the various parts of the body and monitors user motion using wearable sensors 122 in order to reach the determined requirements. For example, the wearable actuators 124 attached to the user's wrist may apply forces or vibrations to the user's wrist and the VIUE program 110A, 110B may combine the forces or vibrations with audio cues, such as "open your palm in order to grasp the glass".

Then, at 210, the VIUE program 110A, 110B determines whether the user achieved the objectives. According to an example embodiment, the VIUE program 110A, 110B may ask the user whether the objective was achieved and analyze the verbal answer using NLP to determine whether the objective was achieved. If the VIUE program 110A, 110B determines that the objective was achieved (step 210, "YES" branch), the VIUE program 110A, 110B may terminate. If the VIUE program 110A, 110B determines that the objective was not achieved (step 210, "NO" branch), the VIUE program 110A, 110B may continue to step 204 to receive data from wearable sensors to identify objects. In another embodiment, the VIUE program 110A, 110B may determine automatically whether the objective was achieved based on runtime analysis of data from wearable sensors 122. For example, if the user wanted to grasp a pen and a camera of the wearable device 102 determines that the hand of the user holds the pen, the VIUE program 110A, 110B may determine that the user achieved the objective of grasping the pen. To the contrary, if the VIUE program 110A, 110B determines that the user holds a chopstick the VIUE program 110A, 110B may determine that the objective of the user was not achieved.

It may be appreciated that FIG. 2 provides only an illustration of one implementation and does not imply any limitations with regards to how different embodiments may be implemented. Many modifications to the depicted environments may be made based on design and implementation requirements. For example, the VIUE program 110A, 110B may monitor objects surrounding the visually impaired user using wearable sensors 122 and alert the user when certain actions may cause a collision with one of the surrounding objects. For example, if the visually impaired user is walking and is about to hit an object, the VIUE program 110A, 110B may alert the user of the impeding danger of colliding with the object.

FIG. 3 depicts an example embodiment of a wearable device 102 used by the visually impaired user. According to an example embodiment, the wearable device may have one or more wearable actuators 302, such as gyro or servo motors that are capable of applying forces 304 to different directions in order to induce the user to move the hand in different directions. In addition, by applying more than one actuator, the wearable device may generate a combined force or momentum 304 allowing the user to move and rotate the wrist in a 3D space.

Figure 4:
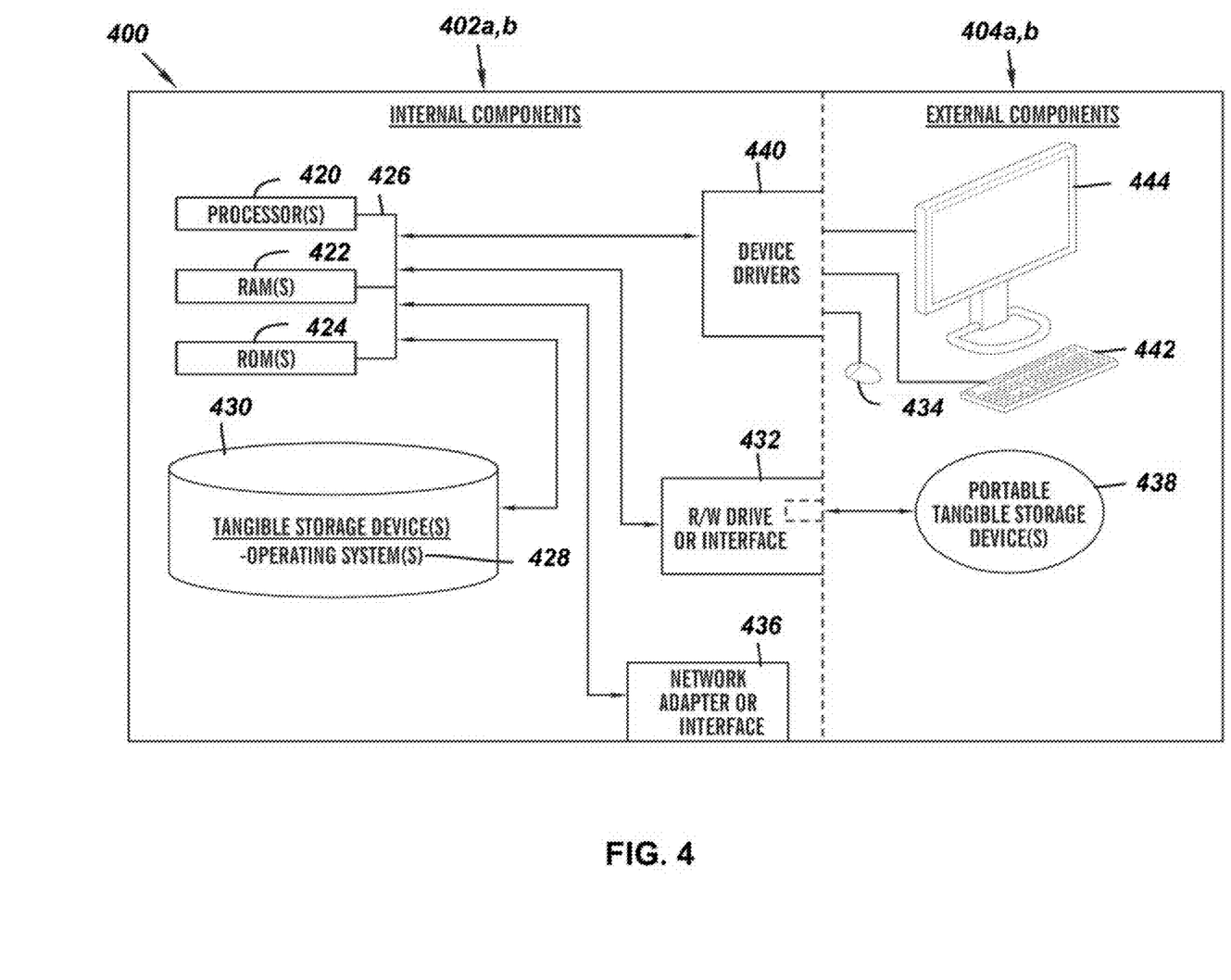
FIG. 4 is a block diagram of internal and external components of computers and servers depicted in FIG. 1 according to at least one embodiment.

FIG. 4 is a block diagram 400 of internal and external components of the wearable device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The wearable device 102 and the server 112 may include respective sets of internal components 402 a,b and external components 404 a,b illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the VIUE program 110A in the wearable device 102, and the VIUE program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 438, read via the respective R/W drive or interface 432, and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. The software program 108 and the VIUE program 110A in the wearable device 102 and the VIUE program 110B in the server 112 can be downloaded to the wearable device 102 and the server 112 from an external computer via a network (for example, the Internet, a local area network or other, wide area network) and respective network adapters or interfaces 436. From the network adapters or interfaces 436, the software program 108 and the VIUE program 110A in the wearable device 102 and the VIUE program 110B in the server 112 are loaded into the respective hard drive 330. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
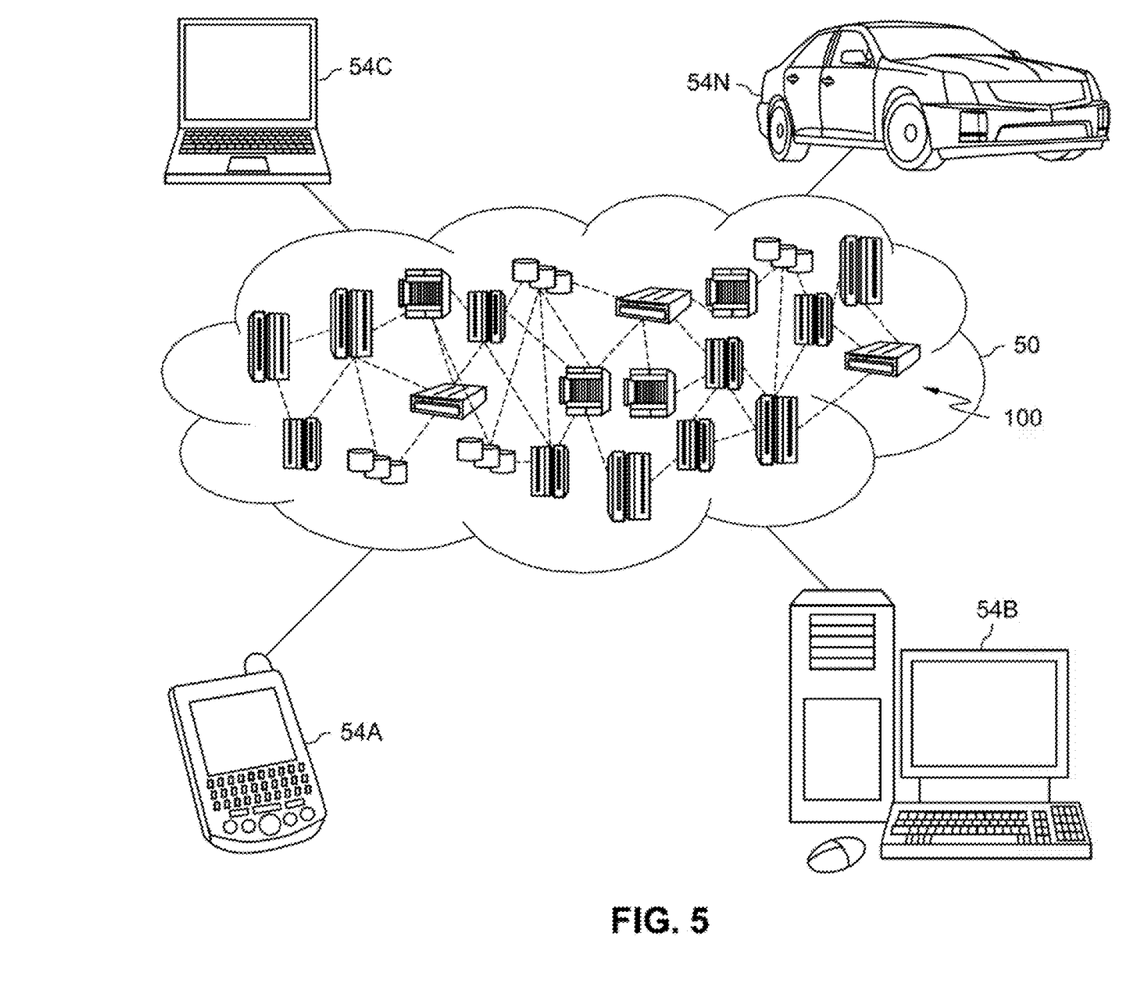
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
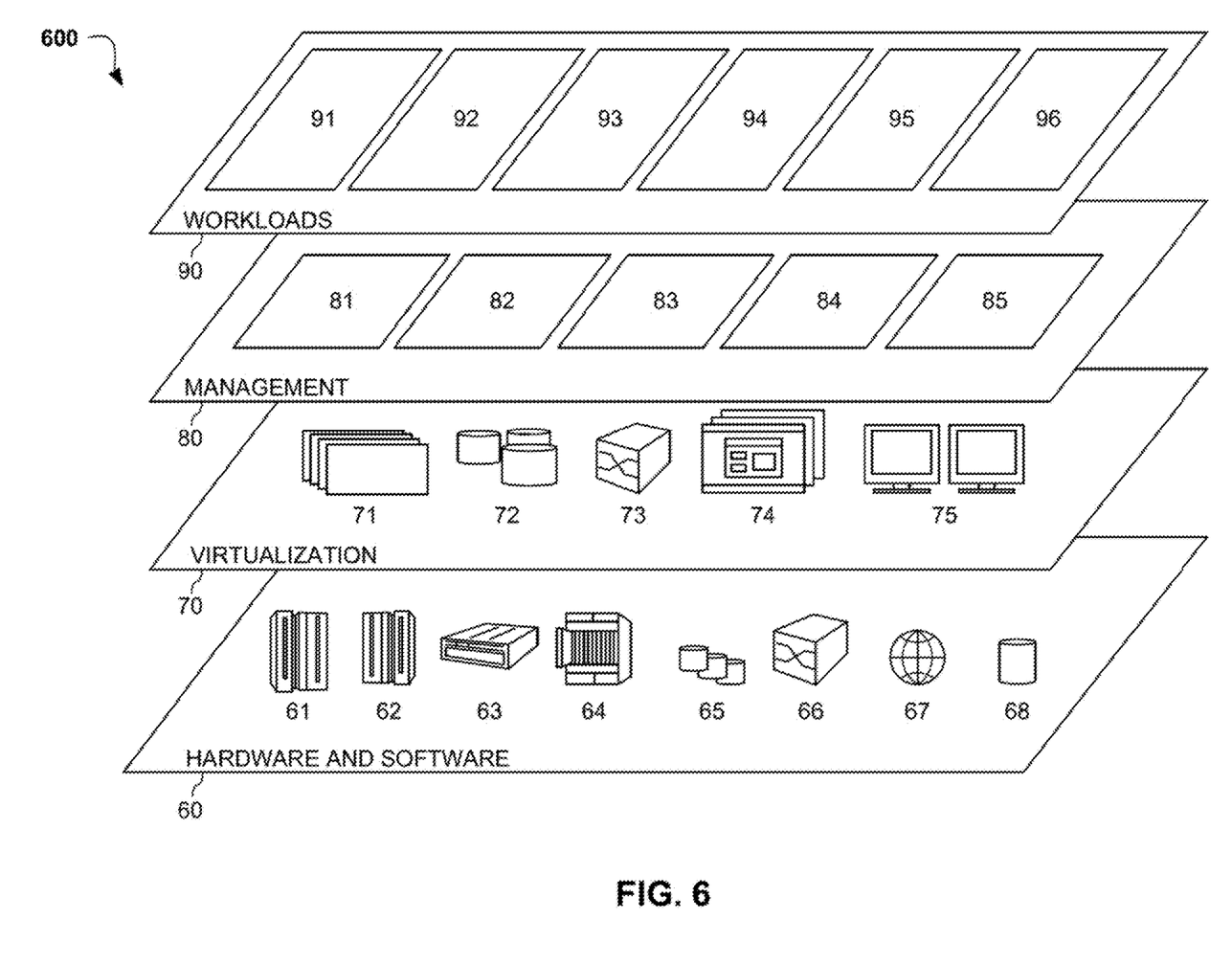
FIG. 6 depicts abstraction model layers according to an embodiment of the present invention.

Referring now to FIG. 6, a set of functional abstraction layers 500 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and visually impaired user enablement 96. Visually impaired user enablement 96 may relate to determining user objectives based on user commands, analyzing the environment using wearable sensors and applying wearable actuators of the one or more wearable devices in order to guide the user to reach the objective.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for a visually impaired user enablement, the method comprising:
    determining, by a wearable device, an objective based on analyzing a voice of a user, wherein the wearable device comprises one or more wearable sensors and one or more wearable actuators;
    identifying objects by the one or more wearable sensors, wherein the identifying comprises use of an object recognition algorithm for image processing of data received from a camera of the one or more wearable sensors;
    determining an action to achieve the objective based on the identified objects; and
    guiding the user to achieve the objective by using the one or more wearable actuators of the wearable device to apply sensational impulses on various body parts of the user and by using audio cues.

2. The processor-implemented method of claim 1, wherein the one or more wearable sensors are selected from a group consisting of a camera, a microphone, a bioelectric sensor, a global positioning system (GPS) sensor, a Lidar sensor, a thermistor, and a micro-electro-mechanical sensor (MEMS).

3. The processor-implemented method of claim 1, wherein the one or more wearable actuators are selected from a group consisting of a speaker, a servo engine, a rotor, a gyro mechanism, a piezo-electric actuator, an electrode to electrify body muscles, and a vibration actuator.

4. The processor-implemented method of claim 1, wherein the objective is determined using artificial intelligence and machine learning components.

5. The processor-implemented method of claim 1, wherein determining the action based on the objective and the identified objects further comprises:
    identifying a maximum reach of a hand in a 3D space; and
    calculating an optimal strategy for the hand to reach the objective.

6. The processor-implemented method of claim 1 further comprising:
    based on determining that the objective of the user was not achieved, repeating the identifying, the determining, and the guiding.

7. The processor-implemented method of claim 6, wherein determining that the objective of the user was not achieved is based on analyzing a verbal response of the user using a natural language processing.

8. A computer system for a visually impaired user enablement, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
  determining, by a wearable device, an objective based on analyzing a voice of a user, wherein the wearable device comprises one or more wearable sensors and one or more wearable actuators;
  identifying objects by the one or more wearable sensors, wherein the identifying comprises use of an object recognition algorithm for image processing of data received from a camera of the one or more wearable sensors;
  determining an action to achieve the objective based on the identified objects; and
  guiding the user to achieve the objective by using the one or more wearable actuators of the wearable device to apply sensational impulses on various body parts of the user and by using audio cues.

9. The computer system of claim 8, wherein the one or more wearable sensors are selected from a group consisting of a camera, a microphone, a bioelectric sensor, a global positioning system (GPS) sensor, a Lidar sensor, a thermistor, and a micro-electro-mechanical sensor (MEMS).

10. The computer system of claim 8, wherein the one or more wearable actuators are selected from a group consisting of a speaker, a servo engine, a rotor, a gyro mechanism, a piezo-electric actuator, an electrode to electrify body muscles, and a vibration actuator.

11. The computer system of claim 8, wherein the objective is determined using artificial intelligence and machine learning components.

12. The computer system of claim 8, wherein determining the action based on the objective and the identified objects further comprises:
  identifying a maximum reach of a hand in a 3D space; and
  calculating an optimal strategy for the hand to reach the objective.

13. The computer system of claim 8 further comprising:
  based on determining that the objective of the user was not achieved, repeating the identifying, the determining, and the guiding.

14. The computer system of claim 13, wherein determining that the objective of the user was not achieved is based on analyzing a verbal response of the user using a natural language processing.

15. A computer program product for a visually impaired user enablement, the computer program product comprising:
  one or more computer-readable tangible storage medium and program instructions stored on at least one of the one or more tangible storage medium, the program instructions executable by a processor, the program instructions comprising:
    program instructions to determine, by a wearable device, an objective based on analyzing a voice of a user, wherein the wearable device comprises one or more wearable sensors and one or more wearable actuators;
    program instructions to identify objects by the one or more wearable sensors, wherein the identifying comprises use of an object recognition algorithm for image processing of data received from a camera of the one or more wearable sensors;
    program instructions to determine an action to achieve the objective based on the identified objects; and
    program instructions to guide the user to achieve the objective by using the one or more wearable actuators of the wearable device to apply sensational impulses on various body parts of the user and by using audio cues.

16. The computer program product of claim 15, wherein the one or more wearable sensors are selected from a group consisting of a camera, a microphone, a bioelectric sensor, a global positioning system (GPS) sensor, a Lidar sensor, a thermistor, and a micro-electro-mechanical sensor (MEMS).

17. The computer program product of claim 15, wherein the one or more wearable actuators are selected from a group consisting of a speaker, a servo engine, a rotor, a gyro mechanism, a piezo-electric actuator, an electrode to electrify body muscles, and a vibration actuator.

18. The computer program product of claim 15, wherein the objective is determined using artificial intelligence and machine learning components.

19. The computer program product of claim 15, wherein program instructions to determine the action based on the objective and the identified objects further comprises:
  program instructions to identify a maximum reach of a hand in a 3D space; and
  program instructions to calculate an optimal strategy for the hand to reach the objective.

20. The computer program product of claim 15 further comprising:
  based on determining that the objective of the user was not achieved, program instructions to repeat the program instructions to identify, the program instructions to determine, and the program instructions to guide steps.

* * * * *